United States Patent [19]

Oguri et al.

[11] Patent Number: 4,574,012
[45] Date of Patent: Mar. 4, 1986

[54] CALCIUM SILICATE SHAPED PRODUCT

[75] Inventors: Yasuo Oguri, Tokyo; Mitsuru Awata, Kodaira; Noriyuki Ariyama, Hino, all of Japan

[73] Assignee: Mitsubishi Chemical Industries Ltd., Tokyo, Japan

[21] Appl. No.: 453,828

[22] Filed: Dec. 28, 1982

[30] Foreign Application Priority Data

Feb. 24, 1982 [JP] Japan .................. 57-28358

[51] Int. Cl.⁴ .................. C04B 7/34; E04B 1/76
[52] U.S. Cl. .................. 106/120; 252/62
[58] Field of Search .................. 501/4, 87, 88, 92, 96; 252/62; 106/120

[56] References Cited

U.S. PATENT DOCUMENTS

| | | | |
|---|---|---|---|
| 3,001,882 | 9/1961 | Taylor | 106/120 |
| 3,898,091 | 8/1975 | Stout | 106/48 |
| 3,904,427 | 9/1975 | Hawthorne | 106/55 |
| 3,988,190 | 10/1976 | McWilliams | 156/145 |
| 4,179,303 | 12/1979 | Shannon | 106/119 |
| 4,359,496 | 11/1982 | Kratel et al. | 428/75 |
| 4,427,611 | 1/1984 | Oguri et al. | 106/120 X |
| 4,455,246 | 6/1984 | Schmidt et al. | 106/99 X |

FOREIGN PATENT DOCUMENTS

| | | |
|---|---|---|
| 1005136 | 9/1965 | United Kingdom . |
| 1247674 | 9/1971 | United Kingdom . |
| 1462242 | 1/1977 | United Kingdom . |
| 1537098 | 12/1978 | United Kingdom . |
| 1553493 | 9/1979 | United Kingdom . |
| 1573519 | 8/1980 | United Kingdom . |
| 1580909 | 12/1980 | United Kingdom . |

Primary Examiner—William R. Dixon, Jr.
Assistant Examiner—Steven Capella
Attorney, Agent, or Firm—Oblon, Fisher, Spivak, McClelland & Maier

[57] ABSTRACT

A calcium silicate shaped product comprises heat-resistant particles having a radiation energy absorptivity of at least 20% throughout the entire range of the wavelength of from about 2 to about 5μ, as measured by a 0.1 wt. % KBr disc method.

7 Claims, 2 Drawing Figures

CALCIUM SILICATE SHAPED PRODUCT

The present invention relates to a calcium silicate shaped product which has a low thermal conductivity within a wide practical temperature range and which exhibits a minimum decrease in its strength even when used at a high temperature.

Calcium silicate products have been widely used as heat insulators or refractory materials. When they are used as heat insulators, they are usually selected from those having a small bulk density to improve their heat insulating property. Whereas when they are used as refractory materials, they are usually selected from those having a higher bulk density than heat insulators because they are required to have an adequate strength at a high temperature.

The thermal conductivity of a calcium silicate product changes with an increase of the temperature. For instance, the thermal conductivity of a low bulk density product is relatively small at a low temperature but rapidly increases as the temperature rises, whereas a high bulk density product has a relatively small thermal conductivity at a high temperature as compared with the low bulk density product. This phenomenon is attributable to the radiation thermal conduction which is predominant in the thermal conduction of the low bulk density shaped product and which increases in proportion to the fourth power of the temperature. This means that when the calcium silicate shaped product is used as a heat insulator or a refractory material, there is a certain bulk density for every practical temperature range where the thermal conductivity reaches a minimum.

However, it is not economical that the shaped product having a certain bulk density can be effectively used only within an extremely limited temperature range. Further, such a shaped product is required to have a high bulk density for a high temperature use and in such a case the heat capacity of the shaped product itself becomes substantial due to the increase of the bulk density.

Accordingly, it is an object of the present invention to provide a calcium silicate shaped product having a low thermal conductivity within a wide practical temperature range. Namely, the present invention is intended to provide a calcium silicate shaped product which has a relatively low bulk density and nevertheless exhibits a minimum increase in the thermal conductivity due to an increase of the temperature.

Another object of the present invention is to provide a calcium silicate shaped product which exhibits a minimum decrease in its strength even when used at a high temperature.

The present invention provides a calcium silicate shaped product which comprises heat-resistant particles having a radiation energy absorptivity of at least 20% throughout the entire range of the wavelength of from about 2 to about $5\mu$, as measured by a 0.1 wt.% KBr disc method.

Now the present invention will be described in further detail.

When the calcium silicate shaped product is used as a heat insulator or a refractory material, the practical temperature range is usually from 100° to 900° C.

As represented by the following equation known as Wien's principle, the wavelength $\lambda$ max. at which the radiation energy is at the maximum level tends to be shorter with an increase of the temperature.

$$\lambda\text{max.} \times T = 0.002898 \text{ (mK)}$$

Accordingly, the radiation energy absorptive material to be used in the present invention is selected from those having a greater absorptivity than calcium silicate over the entire range of the wavelength of the radiation energy corresponding to the practical temperature range within which the calcium silicate shaped product is used.

Specifically, the radiation energy absorptive material is selected from those capable of absorbing radiation energy having a wavelength of from about 2 to $5\mu$ taking into account the temperature of at least 300° C. where the increase of the thermal conductivity due to an increase of the temperature becomes relatively great. Likewise, for a practical temperature range of at least 100° C., a radiation energy absorptive material is used which is capable of absorbing radiation energy having a wavelength of from about 2 to about $8\mu$. The wavelength of about $2\mu$ represents the wavelength of the radiation energy corresponding to a temperature as high as about 900° C., whereas the wavelength of about $8\mu$ represents the wavelength of the radiation energy corresponding to a temperature of about 100° C.

Thus, the radiation energy absorptive material to be used in the present invention is required to have a greater absorptivity than calcium silicate itself over the entire range of the wavelength as mentioned above. This requirement is satisfied by using heat-resistant particles having a radiation energy absorptivity of at least 20% within the respective wavelength ranges, as measured by a 0.1 wt.% KBr disc method.

Figure 1:
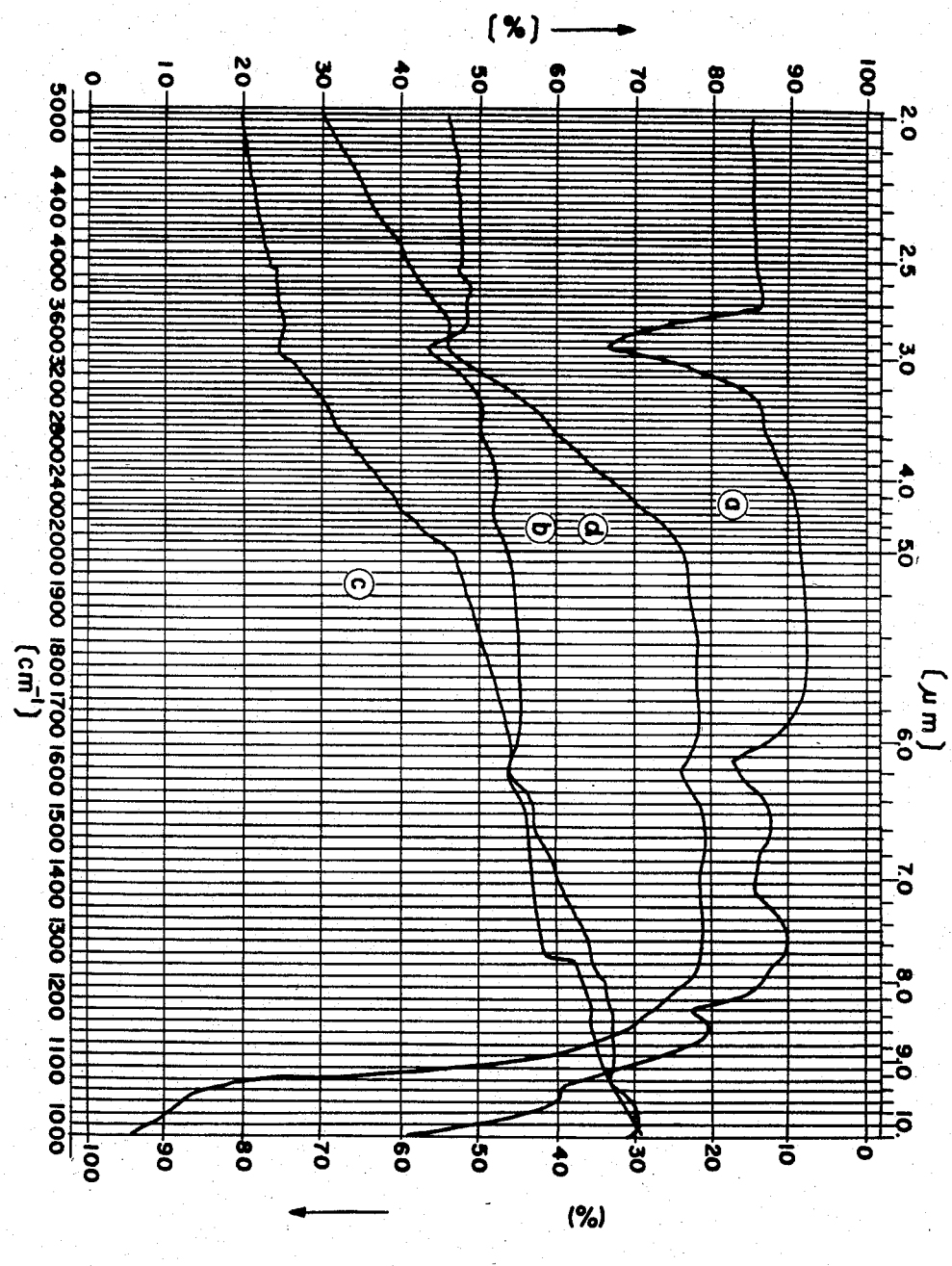
FIG. 1 is a graph showing infrared absorption spectra as measured by the 0.1 wt.% KBr disc method.

Referring to FIG. 1, line (a) is the infrared absorption spectrum of calcium silicate, line (b) is that of ilmenite, line (c) is that of silicon carbide and line (d) is that of silicon nitride. As is apparent from this Figure, the above mentioned requirement is satisfied if the absorptivity throughout the entire range of from 2 to $5\mu$ or from 2 to $8\mu$, is at least 20%. A preferred absorptivity is at least 30%. Silicon carbide is particularly preferred.

It is usually required that the radiation energy absorptive material has adequate heat resistance to a temperature of at least 500° C., preferably at least 800° C.

As specific examples of such material, there may be mentioned carbides such as boron carbide, titanium carbide, tungsten carbide and molybdenum carbide in addition to the above mentioned silicon carbide, nitrides such as silicon nitride, boron nitride and titanium nitride, or oxides such as ilmenite, titanium oxide, iron oxide, and manganese oxide.

The radiation energy absorptive material is used in the form of particles having an average particle size of at most $50\mu$, preferably from 0.5 to $30\mu$, more preferably from 1 to $10\mu$.

The amount of the radiation energy absorptive material incorporated in the calcium silicate shaped product is usually from 0.5 to 20 wt.%, preferably from 1 to 10 wt.%, based on the dry weight of the shaped product. If the amount exceeds the above range, the thermal conductivity of the material itself tends to be too great whereby the thermal conductivity of the shaped product becomes to be too great. On the other hand, if the amount is less than the above range, its adequate effectiveness for the reduction of the thermal conductivity can not be expected.

The calcium silicate product may be produced by various conventional processes. For instance, there may be mentioned (1) a method in which an aqueous slurry containing a calcium silicate hydrate obtained by dispersing a calcareous material and a siliceous material in water and reacting them under heating, is pressfilter-molding by a filter press, followed by drying or by steam curing and drying, (2) a method in which a calcareous material and a siliceous material are dispersed in water, the slurry thereby obtained is poured into a mold, steam-cured and then dried, or (3) a method in which a calcareous material and a siliceous material are dispersed in water, they are reacted under atmospheric pressure and then pressfilter-molding by a filter press, followed by steam curing and drying.

In the present invention, the method (1) is preferred since it is thereby possible to obtain a calcium silicate shaped product having a low bulk density and high strength.

As the siliceous material, there may be mentioned natural materials such as diatomaceous earth, ground quartzite and quartz; silicon dust; and industrial by-products such as ground quartzite obtained by reacting aluminum hydroxide with hexafluorsilicic acid formed as a by-product in a wet process for producing phosphoric acid. This siliceous material may be amorphous or crystalline.

As the calcareous material, there may be used conventional materials such as quick lime, slaked lime, and carbide waste.

When it is desired to obtain a final shaped product in which the crystals of calcium silicate hydrate are in the form of xonotlite, the molar ratio of the calcareous material to the siliceous material ($CaO/SiO_2$) is usually selected within a range of from 0.8 to 1.2. Whereas, when tobermorite is desired, the molar ratio is usually within a range of from 0.7 to 1.0.

The calcium silicate hydrate usually undergoes transformation in the following order: tobermorite gel→C-S-H(II)→C-S-H(I)→11 Å tobermorite (i.e. crystalline tobermorite) or tobermorite gel→C-S-H(II)→C-S-H(I)→xonotlite. Accordingly, the desired crystals may readily be obtained simply by controlling the reaction temperature and time usually within a range of 80° to 230° C. for from 30 minutes to 10 hours. Namely, if the reaction temperature is raised or if the reaction time is prolonged, the transformation of the crystals proceeds in the direction shown by the arrow (→).

The slurry thus obtained is usually admixed with a reinforcing fiber in accordance with a conventional manner and then subjected to press filtration shaping or molding by pouring the slurry into a mold. It is of course possible that the reinforcing fiber is preliminarily incorporated prior to the preparation of the slurry. As the reinforcing fiber, there may be used various types of conventional fibers such as glass fibers, rock fibers, and asbestos. The reinforcing fiber is usually incorporated in an amount such that it constitutes from 0.5 to 10% by weight in the final shaped product.

The shaped product thus obtained is subjected to steam curing, i.e. so-called autoclave curing, under pressure and then dried to obtain a desired final shaped product. Or, the desired shaped product may be obtained simply by subjecting the shaped product directly to a drying step.

The radiation energy absorptive material may be added in any one of the steps prior to the shaping step during the above mentioned process for preparing a calcium silicate shaped product. However, it is usual that the radiation energy absorptive material is added to the starting materials or it is added to the slurry after the reaction of starting materials. Thus, it is possible to obtain a calcium silicate shaped product having a low thermal conductivity within a wide practical temperature range. The calcium silicate product of the present invention thus obtained also has a feature that it shows a minimum decrease in its strength even when used at a high temperature. Namely, the strength of the shaped product composed of needle-like xonotlite crystals having a diameter of from 0.1 to 0.3$\mu$ or lath-like tobermorite crystals having a diameter of a few microns or a mixture of these crystals, is derived from the mutual engagement of these crystals.

However, if such a shaped product is heated, for instance, at a temperature of from 750° to 800° C., the xonotlite crystals or the tobermorite crystals undergo a topotactic dehydration reaction, whereby the mutual engagement of the crystals will be weak and the strength will be reduced to a large extent.

Whereas, the shaped product of the present invention contains the radiation absorptive material composed of heat-resistant particles, and when the crystals undergo a topotactic dehydration reaction, the heat-resistant particles assist the mutual engagement of the crystals and thus serve to prevent the reduction of the strength of the shaped product. The shaped product thus shows a minimum reduction in its strength even when used at a high temperature.

Now, the present invention will be described in further detail with reference to Examples. In the Examples, the "parts" and "%" are meant for "part(s) by weight" and "% by weight" unless otherwise specified.

EXAMPLE 1

Warm water was added to 49.6 parts of quick lime (96.2% of CaO) for slaking to obtain a slaked lime slurry, and to this slurry 50.4 parts of ground quartzite (96.4% of $SiO_2$) was added. Then, water was added to bring the total amount of water to be 27.5 times by weight relative to the solid components. This slurry was reacted for two hours under steam pressure of 15 kg/cm$^2$G to obtain C-S-H(I) calcium silicate hydrate. To this calcium silicate hydrate, 3 parts of glass fiber as reinforcing material and 5 parts of silicon carbide having an average particle size of 3$\mu$ were incorporated. This slurry mixture was adjusted to bring its bulk density to be 0.1 and 0.2 and then filter-pressed to obtain a shaped product of 300×300×50 t$^{mm}$. This shaped product was subjected to steam curing under steam pressure of 10 kg/cm$^2$G to transform C-S-H(I) to xonotlite. Thereafter, the product was dried for 15 hours at 180° C. to obtain a xonotlite shaped product. The thermal conductivity of this shaped product was measured by Hot-Wire method at each temperature of 20° C., 100° C., 200° C., 300° C., 650° C. and 850° C.

Further, the xonotlite shaped product was heated for 24 hours at each temperature of 650° C., 850° C. and 1000° C., and the compression strength after the heating was measured.

The results thereby obtained are shown in Table 1.

COMPARATIVE EXAMPLE 1

The operation was conducted in the same manner as in Example 1 except that the silicon carbide was not incorporated.

The physical properties of the shaped product thereby obtained were measured in the same manner as in Example 1. The results thereby obtained are shown in Table 1.

EXAMPLE 2

To a slaked lime-ground quartzite-water slurry prepared in the same manner as in Example 1, 5 parts of silicon carbide having a particle size of from 1 to 30$\mu$ was added and the slurry mixture thereby obtained or reacted for 2 hours under steam pressure of 15 kg/cm$^2$G to obtain C-S-H(I) calcium silicate hydrate. To this slurry, 3 parts of glass fiber was added. Thereafter, the same operation as in Example 1 was conducted to obtain xonotlite shaped products having a bulk density of 0.10 and 0.20. The physical properties of the shaped products were measured in the same manner as in Example 1. The results thereby obtained are shown in Table 1.

EXAMPLE 3

A slaked lime-ground quartzite-water slurry prepared in the same manner in Example 1 was reacted for 8 hours under steam pressure of 15 kg/cm$^2$G to obtain a xonotlite slurry. To this slurry, 3 parts of glass fiber as reinforcing material and 5 parts of silicon nitride having a particle size of from 1 to 10$\mu$ were added. This slurry mixture was adjusted to have a bulk density of 0.12 and filter-pressed to obtain a shaped product of 300×300×50 t$^{mm}$. This shaped product was dried for 15 hours at 180° C. to obtain a xonotlite shaped product.

The physical properties of this shaped product are shown in Table 1.

EXAMPLE 4

To a C-S-H(I) calcium silicate hydrate prepared in the same manner as in Example 1, 5 parts of ilmenite [(Fe,Mg)TiO$_3$] having a particle size of from 1 to 5$\mu$ and 3 parts of glass fiber were added. This slurry mixture was adjusted to have a bulk density of 0.1 and then filter-pressed to obtain a shaped product of 300×300×50 t$^{mm}$. This shaped product was subjected to steam curing under steam pressure of 15 kg/cm$^2$G for transformation to xonotlite and then dried for 15 hours at 180° C. to obtain a xonotlite shaped product.

The physical properties of this shaped product are shown in Table 1.

TABLE 1

|  | Example 1 | | Example 2 | | Example 3 | Example 4 | Comparative Example 1 | |
|---|---|---|---|---|---|---|---|---|
| Specific gravity | 0.10 | 0.20 | 0.10 | 0.20 | 0.12 | 0.10 | 0.10 | 0.20 |
| Bending strength [Kg/cm$^2$] | 6.2 | 17.9 | 7.6 | 18.5 | 4.0 | 7.4 | 6.3 | 18.3 |
| Compression strength [Kg/cm$^2$] | 6.5 | 11.6 | 7.1 | 12.0 | 5.6 | 7.2 | 6.4 | 12.4 |
| Thermal conductivity [Kcal/m · hr · °C.] | | | | | | | | |
| 20° C. | 0.034 | 0.048 | 0.033 | 0.047 | 0.035 | 0.033 | 0.034 | 0.048 |
| 100° C. | 0.040 | 0.056 | 0.041 | 0.057 | 0.042 | 0.040 | 0.041 | 0.059 |
| 200° C. | 0.050 | 0.068 | 0.049 | 0.066 | 0.051 | 0.049 | 0.050 | 0.070 |
| 300° C. | 0.058 | 0.075 | 0.056 | 0.075 | 0.060 | 0.059 | 0.065 | 0.081 |
| 450° C. | 0.084 | 0.087 | 0.083 | 0.085 | 0.087 | 0.083 | 0.095 | 0.098 |
| 650° C. | 0.123 | 0.115 | 0.120 | 0.110 | 0.131 | 0.121 | 0.150 | 0.130 |
| 850° C. | 0.175 | 0.140 | 0.183 | 0.145 | 0.185 | 0.187 | 0.240 | 0.185 |
| Compression strength after heating [Kg/cm$^2$] | | | | | | | | |
| 650° C. × 24 hrs. | 6.0 | 11.5 | 7.0 | 11.7 | 5.3 | 6.5 | 6.0 | 12.0 |
| 850° C. × 24 hrs. | 5.2 | 11.0 | 6.5 | 11.4 | 4.8 | 6.0 | 5.1 | 10.0 |
| 1000° C. × 24 hrs. | 4.5 | 7.5 | 4.8 | 8.0 | 4.0 | 5.0 | 1.0 | 3.0 |

Figure 2:
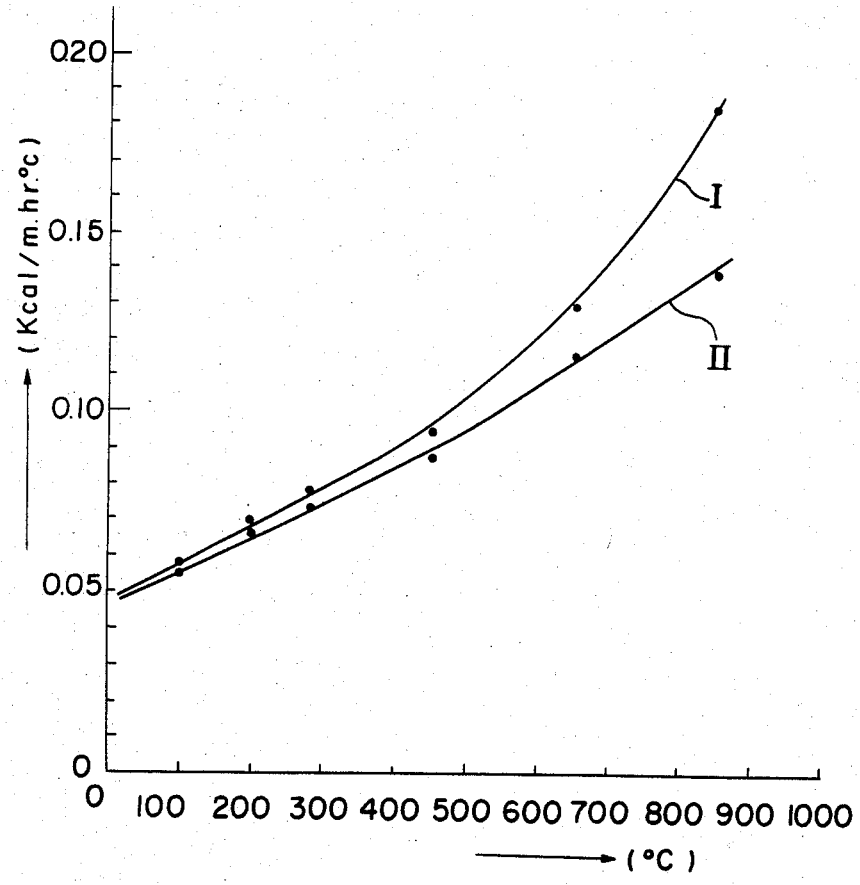
FIG. 2 is a graph showing the changes of the thermal conductivities of the calcium silicate shaped products having a specific gravity of 0.20, due to the temperature changes.

FIG. 2 shows a graph illustrating the changes in the thermal conductivities of the calcium silicate shaped products due to the temperature changes. Line (I) represents the change in the thermal conductivity of the conventional shaped product obtained by the Comparative Example 1, and line (II) represents the change in the thermal conductivity of the shaped product of the present invention obtained by Example 1. Each of the calcium silicate shaped products had a specific gravity of 0.20.

We claim:

1. A shaped calcium silicate product in which the shaped calcium silicate matrix material has incorporated therein particles of silicon carbide, silicon nitride or ilmenite, said shaped calcium silicate matrix material being prepared by dispersing a calcareous material and a siliceous material selected from the group consisting of diatomaceous earth, ground quartzite, quartz, silicon dust and silicon containing industrial by-products in water; heating the dispersion to react said calcareous and siliceous materials, thereby forming a calcium silicate slurry; press filter molding said slurry in a filter press; and drying said molded material.

2. The shaped calcium silicate product of claim 1, wherein the heat-resistant particles have an average particle size of from 0.5 to 50$\mu$.

3. The shaped calcium silicate product of claim 2, wherein said particles have an average particle size of from 0.5 to 30$\mu$.

4. The shaped calcium silicate product of claim 3, wherein the particle size range of said particles ranges from 1 to 10$\mu$.

5. The shaped calcium silicate product of claim 1, wherein the heat-resistant particles are present in said shaped product in an amount of from 0.5 to 20 weight percent on a dry basis.

6. The shaped calcium silicate product of claim 5, wherein the amount of said particles ranges from 1 to 10 weight percent on a dry basis.

7. The shaped calcium silicate product of claim 1, wherein after press filter molding said heated dispersion, the molded product is steam-cured prior to drying.

* * * * *